(12) United States Patent
Baeten et al.

(10) Patent No.: US 6,446,009 B1
(45) Date of Patent: Sep. 3, 2002

(54) SEISMIC DATA ACQUISITION AND METHOD FOR SPATIALLY FILTERING SEISMIC DATA

(75) Inventors: Guido Josèf Maria Baeten, Redhill; Ralf-Gunter Ferber, Horsham; Reinhard Lengeling, Long Ditton, all of (GB)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/719,250

(22) PCT Filed: Jun. 24, 1999

(86) PCT No.: PCT/GB99/01984

§ 371 (c)(1),
(2), (4) Date: Dec. 8, 2000

(87) PCT Pub. No.: WO00/00843

PCT Pub. Date: Jan. 6, 2000

(30) Foreign Application Priority Data

Jun. 27, 1998 (GB) .............................................. 9813851

(51) Int. Cl.[7] ................................................. G01V 1/36
(52) U.S. Cl. ............................................ 702/17; 367/45
(58) Field of Search ............................. 367/73, 45, 56, 367/50; 702/17

(56) References Cited

U.S. PATENT DOCUMENTS 5,150,331 A * 9/1992 Harris et al. .................. 367/50
5,781,503 A * 7/1998 Kim ............................. 367/45

* cited by examiner

*Primary Examiner*—Donald E. McElheny, Jr.
(74) *Attorney, Agent, or Firm*—David S. Figatner

(57) ABSTRACT

A method of acquiring and processing seismic data involving deploying a number of seismic sensors, actuating a seismic source, receiving seismic signals produced by the seismic source using the seismic sensors, calculating offset distances (44) between the seismic source and the seismic sensors, and (42) producing spatially filtered seismic data from the received seismic signals. The inventive method may be used effectively with receiver arrays having smaller areal footprints and fewer sensors per receiver station location than conventional seismic data acquisition systems. It also allows ground roll and random noise to be effectively attenuated as the seismic data is spatially resampled or prepared for spatial resampling.

22 Claims, 3 Drawing Sheets

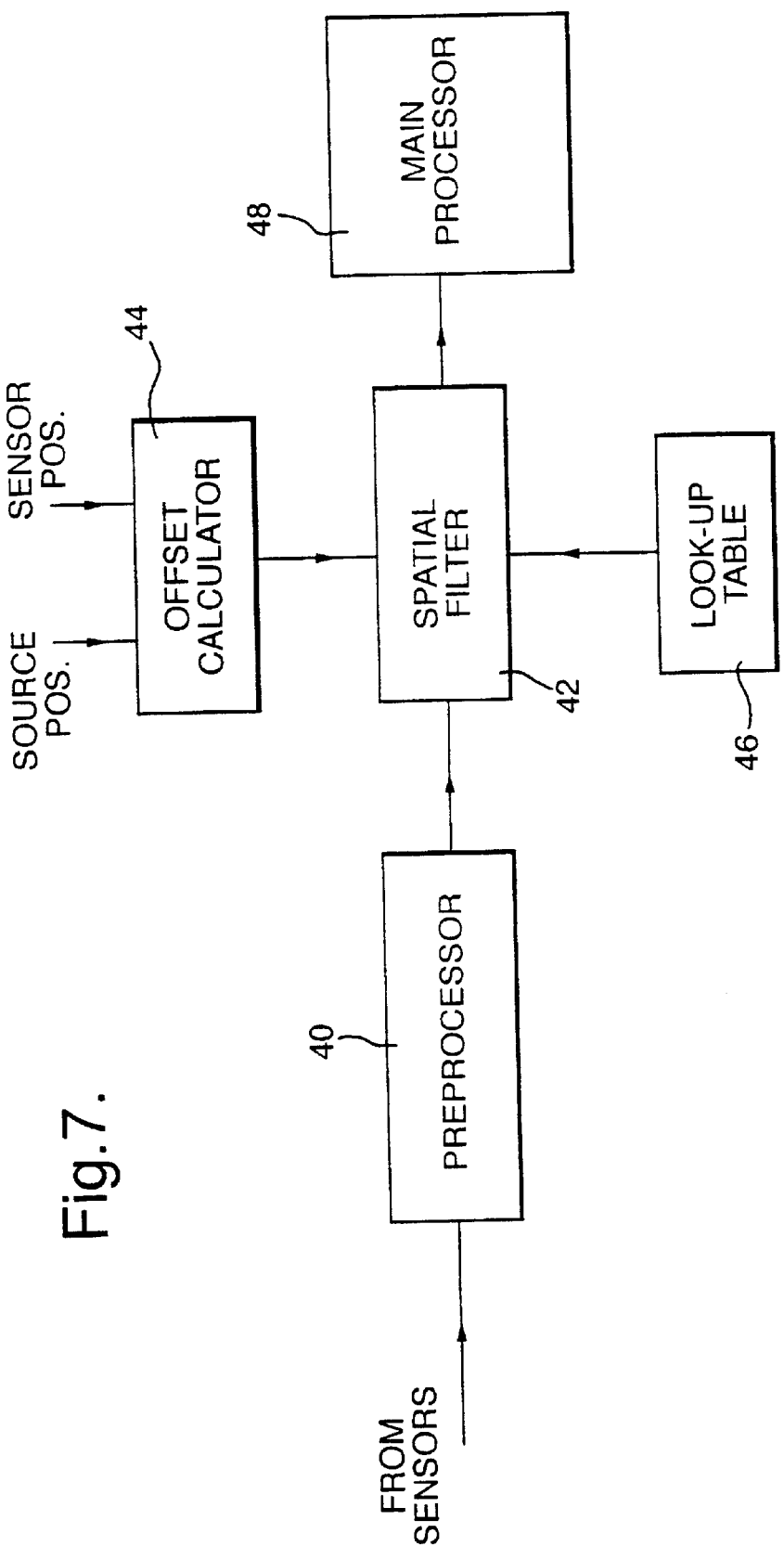

SEISMIC DATA ACQUISITION AND METHOD FOR SPATIALLY FILTERING SEISMIC DATA

BACKGROUND OF THE INVENTION

The present invention relates to a method of acquiring and processing seismic data and in particular to a method of acquiring and processing seismic data that produces spatially filtered seismic data using calculated offset distances.

Seismic data is collected to analyze the subsurface of the Earth, and is particularly collected in connection with hydrocarbon exploration and production activities. Seismic data for analyzing subsurface structures may be collected on land or over water. In order to obtain seismic data, an acoustic source is used which typically consists of explosives or a seismic vibrator on land or an impulse of compressed air at sea. The seismic data acoustic signals reflected by the various geologic layers beneath the surface of the Earth are known as traces and are sensed by a large number, typically hundreds or thousands, of sensors such as geophones on land and hydrophones at sea. The reflected signals are recorded and the results are analyzed to derive an indication of the geology in the subsurface. Such indications may then be used to assess the likelihood and location of potential hydrocarbon deposits.

Seismic surveys are generally conducted using one or more receiver lines having a plurality of receiver station locations spaced evenly along their lengths. In a two dimensional (2D) survey, a single receiver line is used and the acoustic source is typically positioned at various points in-line with the receiver line. In a three dimensional (3D) survey, a plurality of parallel receiver lines are typically used and the acoustic source is generally positioned at various points offset from the receiver lines. While a 2D seismic survey can only create a cross-sectional representation of the subsurface, a 3D seismic survey can be used to develop a three dimensional representation of the subsurface.

Conventional seismic data acquisition systems employ a receiver array at each receiver station location. All of the sensors in a conventional receiver array are connected together (electrically "hardwired") and the receiver array delivers a single output trace at the particular receiver station location about which the sensors are placed. Conventional hardwired receiver arrays perform two important functions when acquiring seismic data.

First, the receiver arrays attenuate ground roll noise. Ground roll is a portion of the acoustic energy produced by the acoustic source that is not transmitted downward toward the subsurface formations, but instead travels horizontally along the earth's surface. This portion of the seismic signal travels at the Rayleigh wave velocity, which is typically much slower than the velocity of the pressure wave that is transmitted toward the subsurface formations. Although the pressure wave typically travels much faster than the ground roll wave, the pressure wave must travel a much greater distance than the ground roll wave, and the pressure wave and the ground roll wave often arrive simultaneously at a seismic sensor for some portion of the seismic data record. Because the ground roll wave typically contains no information regarding the subsurface geologic structure being investigated, it must be attenuated (i.e. removed) to the greatest extent possible before the seismic data is used to produce maps of the subsurface.

A conventional approach to the problem of ground roll suppression in seismic data processing is to use receiver arrays during data acquisition and then to stack together (i.e. combine/aggregate/add together) the seismic data signals obtained from each of the sensors in the receiver array. Ground roll is generally considered a dominant noise source and effective removal of the ground roll signal often greatly enhances the quality of the subsurface image obtained from the seismic survey. Current seismic data acquisition systems typically employ receiver arrays whose spatial extent is such that noise waves with wavelengths up to 1.4 times the sensor pattern length are attenuated.

A second reason receiver arrays are used in conventional seismic data acquisition systems is to attenuate random noise. By making numerous measurements of the seismic response at a particular receiver group location using different sensors, random noise can be attenuated by combining the readings from the different sensors. Often more than twenty sensors are used to make up the receiver array at a particular receiver station location. For a group of twenty-four geophones at a receiver station, the signal to noise ratio of the stacked output trace will typically be increased by fourteen dB compared to the readings of each of the individual sensors. If only five geophones were used at the receiver station, the signal to noise ratio will typically be increased only by about seven dB compared to the readings of each of the individual sensors.

The use of conventional hardwired receiver arrays has some distinct disadvantages, however, both from a geophysical point of view and from an economic point of view. Their use leads to a spatial smearing effect: the response at a particular receiver station location is the sum of the spaced apart individual sensors in the receiver array at that location. There is also a trend in the industry towards smaller bin sizes. The standard 50×50 meter bin sizes will likely be reduced in many instances to 40×40 meters or 30×30 meters, for instance, to overcome spatial aliasing problems and to increase resolution. As an example, high resolution is required for reservoir monitoring to establish 3D-impedance maps of the reservoir. This concept of smaller bin sizes is compromised by the spatial smearing effect introduced by conventional receiver arrays. The use of smaller sensor pattern lengths also limits the wavelengths of the ground roll that can be attenuated by stacking together the seismic responses received by each of the sensors.

The costs associated with conventional hardwired receiver arrays are also problematic. Conventional hardwired receiver arrays are expensive to manufacture and maintain due to the large number of sensors needed at each receiver station and the lengths of the electrical cable needed to allow the sensors to be spread out at the receiver station location to form the receiver array. Even more significant is the cost of utilizing these systems in the field, particularly the cost of deploying the sensors in the extremely difficult to access areas in which seismic surveys are often conducted, such as swamps, jungles and forests.

SUMMARY OF THE INVENTION

It is an object of the present invention to provide an improved method of acquiring and processing seismic data that eliminates many of the disadvantages of conventional seismic data acquisition systems that utilize hardwired receiver arrays to attenuate ground roll and random noise.

An advantage of the present invention is that the separation of the reflection energy and the ground roll energy in the F-K domain can be maintained for large cross line offsets in 3D seismic surveys.

Another advantage of the present invention is that it can be used to effectively filter seismic data obtained using a variety of seismic sensor layouts, including crooked receiver lines and non-uniformly spaced receiver station locations.

A further advantage of the present invention is that ground roll and random noise can be effectively attenuated as the seismic data is spatially resampled or is prepared for resampling.

The present invention can also be used effectively with sensor layouts having smaller cross-line areal footprints and fewer sensors per receiver station location than conventional seismic data acquisition systems.

According to the present invention there is provided a method of acquiring and processing seismic data, the method comprising the steps of deploying a plurality of seismic sensors, actuating a seismic source, receiving seismic signals produced by the seismic source using the seismic sensors, calculating offset distances between the seismic source and the seismic sensors, and producing spatially filtered seismic data using the received seismic signals and the calculated offset distances.

In a preferred embodiment, the seismic data is spatially filtered using a frequency independent wavenumber filter and the range of passband wavenumbers used is directly related to the anti-aliased spatial resampling of the seismic data. The use of such a method can produce ground roll and random noise attenuated output traces that are virtually free of spatial aliasing.

In this embodiment, the range of wavenumbers in the seismic data is restricted by spatially convolving the seismic data in the time domain with a wavenumber filter of the form:

$$f(q) = 2k_0 \frac{\sin(2\pi k_0 q)}{2\pi k_0 q}$$

where the range of wavenumbers in the seismic data is restricted to $-k_0 \leq k \leq k_0$, and q is the reduced signed offset sensor coordinate.

The filter used may be truncated by limiting the range of values of $2k_0 q$ to 2 or 3 for instance, to avoid excessive filter lengths. A filter that gives the most optimal results for the given filter length can then be determined.

Also in this embodiment, the wavenumber spectrum of the seismic data is restricted during the data acquisition phase of the seismic survey and the residual portion of the ground roll energy in the seismic data may be removed by frequency dependent wavenumber filtering during later data processing.

Further preferred features of the present invention are set out in the dependent claims.

BRIEF DESCRIPTION OF THE DRAWINGS

The present invention will now be described, by way of example, with reference to the accompanying drawings, in which:

FIG. 7 is a much simplified schematic of an example of a hardware implementation of the invention.

DETAILED DESCRIPTION OF THE PREFERRED EMBODIMENT

Figure 1:
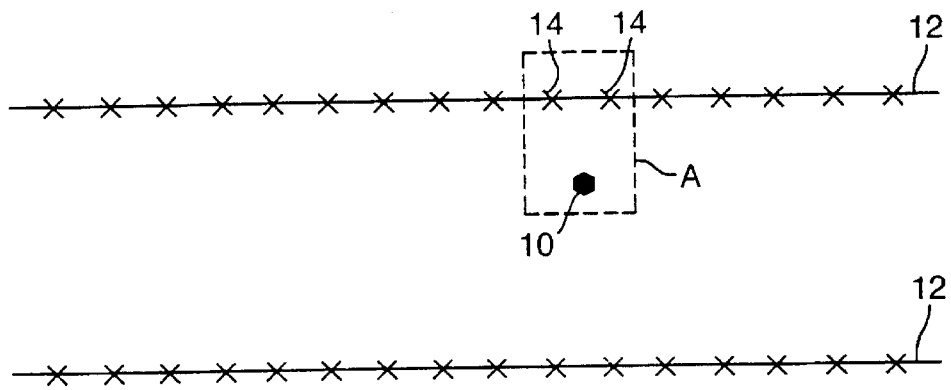
FIG. 1 shows a portion of a seismic data acquisition system.

FIG. 1 shows a seismic source 10 and portions of two receiver lines 12 that form part of a larger receiver array in a seismic data acquisition system. The receiver array is used to measure the seismic signals produced when an acoustic pulse from the seismic source 10 is reflected by the geologic subsurface layers between the source and the sensors forming the receiver array. The receiver line 12 have a plurality of receiver station locations 14 positioned along their lengths. In a typical seismic survey, the receiver array may comprise six receiver lines with ninety-six receiver station locations per receiver line There will typically be several single seismic sensors located near each receiver station location, as discussed in more detail below. The receiver line 12 may be separated from each other by an interval of three hundred meters and there may be fifty meters between each of the receiver stations 14 positioned along the receiver lines. The seismic source 10 may be discharged at points that are fifty meters apart, thereby forming source lines spaced three hundred meters apart (the sources lines being perpendicular to the receiver lines). Six source points per salvo are each recorded on six lines of ninety-six stations. There is a one line roll to maintain homogeneity. This provides a nominal twenty-four fold coverage of the survey area.

Figure 2:
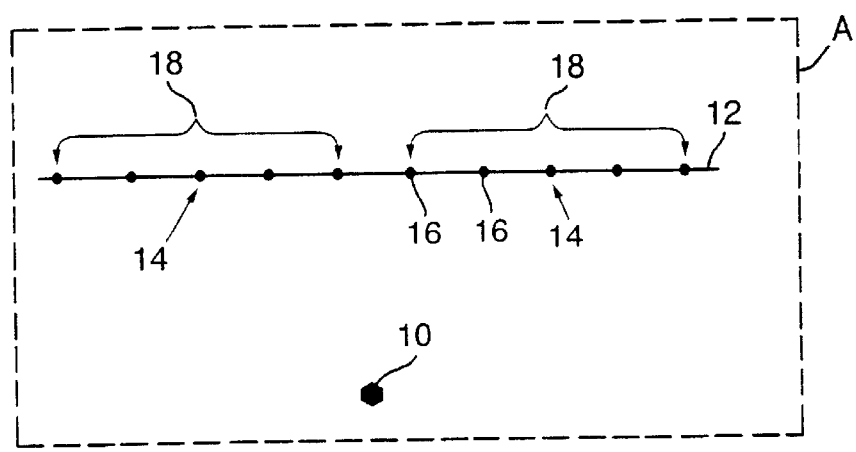
FIG. 2 shows a sensor positioning layout for the seismic data acquisition system.

A close-up view of a part of FIG. 1 identified as section A is enlarged and shown in FIG. 2.

FIG. 2 represents a sensor positioning layout that can be used in the seismic data acquisition system. In FIG. 2, five linearly aligned sensors 16 form a sensor array 18 at each of the receiver station 14 locations and there is a uniform distance between each of the sensors. This is generally referred to as a uniform sampling receiver geometry. The uniform sampling geometry can simplify subsequent processing of data acquired by this type of seismic data acquisition system. The term "sensor array" in this context refers to the areal layout of the individual sensors and does not imply that the sensors 16 are electrically hardwired together.

The purpose of the sensors 16 is to obtain the seismic response at the receiver station 14 location as accurately as possible. The seismic responses from each of the receiver stations 14 on the receiver line 12 are used to prepare maps of the subsurface and to assess the likelihood and location of potential hydrocarbon deposits.

Other types of sensor positioning layouts can also be used, including using single sensors at each receiver station or by limiting the number of sensors at each station to three and either positioning the sensors in-line along the receiver line or positioning the sensors as an isosceles right triangle with one of the common length sides positioned along the receiver line. Sensors that measure more than one type of seismic response, such as 3C geophones, can also be used with the inventive seismic data acquisition and processing method. It is desirable, from a cost viewpoint, to reduce the number of sensors 16 per receiver station 14 to the smallest number that are still able to effectively measure the seismic response at the receiver station location (i.e. to obtain seismic data with a sufficient signal to noise ratio). Tests conducted on behalf of the Assignee of the present invention have confirmed that it is possible to obtain very good seismic data quality while reducing the number of individual sensors 16 per receiver station 14 by a factor of four or five and while simultaneously limiting the cross-line spatial extent of the receiver array formed by the sensors compared to conventional receiver arrays.

If the seismic signals received by the sensors 16 at a particular receiver station 14 are simply stacked together, the limited cross-line spatial extent of the receiver array formed by the sensors in the seismic data acquisition system will not allow the ground roll noise to be effectively attenuated and the limited number of sensors will not sufficiently raise the signal to noise ratio of the received seismic signals.

A technique for attenuating ground roll and increasing the signal to noise ratio in 2D seismic data is to spatially filter the seismic data in the frequency wavenumber (F-K) domain. The wavenumber is defined as being equal to the reciprocal of the apparent wavelength (the frequency divided by the apparent velocity). In the F-K domain, different types of seismic energy are mapped in different areas. Ground roll noise, which in a 2D acquisition environment travels in line, has an apparent velocity (measured along the receiver line) which equals its propagation velocity, and typically varies between 200 meter/second and 1000 meter/second. Reflections, which arrive almost vertically at the sensors, have an apparent velocity which usually exceeds 3000 meters per second.

Accurate F-K plots can only be obtained and effective F-K filters can only be applied, however, if the data is sampled densely enough to prevent spatial aliasing; that is, at least two samples per apparent wavelength are required for unaliased recording. If this condition is not fulfilled, wraparound occurs, indicating that energy of higher wavenumbers is mapped incorrectly at the lower wavenumbers. This aliasing effect seriously distorts the F-K result. In practice, the condition of alias-free data means that, in order to obtain reliable F-K spectra, individual sensor data must be acquired at a dense spatial sampling rate.

For this embodiment of the inventive method to work optimally, the ground roll portion of the seismic data should be spatially sampled at 2 or more points per offset wavelength. While the inventive method is able to properly attenuate ground roll noise that is moderately aliased (where there are less than 2 points per offset wavelength), this aliased ground roll energy will be properly attenuated only when it has been wrapped around (in the F-K domain) to wavenumbers that are outside the determined cut-off wavenumbers discussed below. A maximum spatial increment between the sensors of 5 to 10 meters (in the offset distance domain) is typically desired.

Filtering and analysis of seismic data in the F-K domain has been used for 2D seismic data, typically by using a 2D FFT calculation, an F-K filter, and an inverse 2D FFT calculation. This typically requires the sensors to be spaced at uniform interval distances away from the source. If the seismic signals from each of the sensors in a 3D seismic survey are wavenumber filtered in the receiver coordinates domain (as would normally be done during a 2D seismic survey), the reflection energy and the ground roll energy become blurred together, particularly for large cross-line shot offsets. Also, the sensors in a 3D seismic survey are typically spaced at regular locations along the receiver line, which produces irregular offset spacing, particularly with respect to a source that is substantially offset from the receiver line. Offset distances between the source and the sensors are not routinely calculated during 3D seismic surveys.

Figure 3:
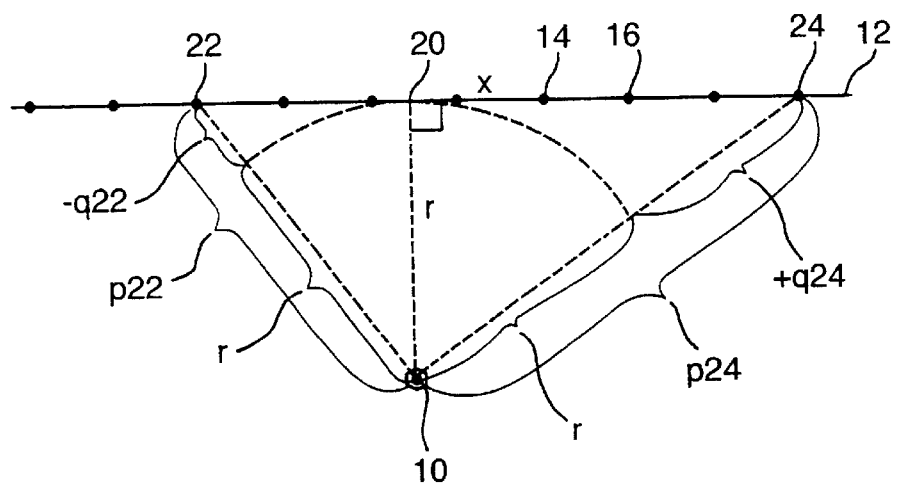
FIG. 3 shows how reduced signed offset coordinates can be calculated.

FIG. 3 shows how a coordinate system based on offset distances can be calculated from the location of the source 10 and the locations of the sensors 16 that is useful in wavenumber filtering the seismic responses received by the sensors. From the location of the source 10 and the coordinates of the receiver line 12, the point 20 on the receiver line 12 closest to the source 10 (x=0) and the distance between the source and the receiver line (labeled "r" in FIG. 4) is determined. Offset coordinates can then be assigned to each of the sensors 16 as follows: determine the offset distance between the source 10 and the sensor 16 (labeled "p" in FIG. 4), subtract from the offset distance "p" the distance "r" between the source and the receiver line (the result being labeled "q" in FIG. 4), assign the difference "q" a positive value if it is located on one side of the point 20 (i.e. positive x values) and assign it a negative value if it is located on the other side of the point 20 (i.e. negative x values). It does not matter which side is assigned as the positive side or the negative side. In the event that an asymmetric filter is used, however, it is important that the sign assignment scheme be applied consistently over the entire data set.

One sensor 16 labeled as first sensor 22 in FIG. 3, offset from the source 10 by the distance $P_{22}$, is located left of the point 20 and has therefore been assigned a reduced signed offset coordinate value of negative $q_{22}$. Similarly a sensor 16 labeled as second sensor 24, offset from the source 10 by the distance $p_{24}$, is located right of the point 20 and has therefore been assigned a reduced signed offset coordinate value of positive $q_{24}$. If the source 10 is located equidistantly from the ends of receiver line 12, using this system the reduced offset coordinate values will run continuously from minus the maximum reduced offset to plus the maximum reduced offset. If not, for computational convenience, the seismic data will first be sorted (ranked by increasing offset), filtered, and then sorted back after filtering.

The inventive method does not require the sensors 16 to be positioned along a line passing precisely through the sensors. In fact, such a placement of sensors 16 is unlikely to ever happen under field conditions. All that is required is to have the sensors 16 positioned somewhat closely to a best-fit line positioned roughly parallel to receiver line 12 and to position the sensors close enough in the offset distance domain to satisfy the spatial anti-aliasing criteria described above.

While allowing the wavenumber spectrum restriction to vary with frequency (an "F-K" filter) results in better ground roll attenuation (because it is better at removing low frequency ground roll energy), the use of a frequency independent wavenumber spectrum restriction filter (a "K" filter) is preferred during the data acquisition phase of the seismic survey for two reasons. First, the K filter is directly linked to the anti-aliasing condition for spatial sampling, and thus to the data acquisition/data resampling process. Second, F-K filtering is often better used as a subsequent processing tool. It is computer-intensive and requires some testing to optimize parameters. Application of an appropriate K filter soon after the data is sensed yields a data set that is virtually free of spatial aliasing, and which can be subjected to a F-K filter during later seismic data processing to remove the residual portion of the ground roll energy in the seismic data, In some cases, an appropriate F-K filter can be derived and applied in the field. This can result in the acquisition of field data that is virtually free of spatial aliasing and ground roll noise.

While it would be possible to apply the K filter by transforming the seismic data into the F-K domain and then multiplying the data with a block function, in practice the use of F-K transforms is often avoided because the transform is a rather CPU intensive application. Also, it would be beneficial to employ the fact that the K filter is frequency-independent. Therefore, it is much more efficient to apply the K filter as a convolution in the offset-time domain.

If the recorded data is denoted as g(q), then the seismic signals as a function of the offset wavenumber k can be described as:

$$G(k) = \int_{-\infty}^{\infty} g(q)\exp(i2\pi kq)\,dq \quad \text{(in continuous notation)},$$

or $$G(k) = \sum_{j=j_1}^{j_2} g(q_j)\exp(i2\pi kq_j)\cdot \Delta q_j \quad \text{(in discrete notation)}$$

Now, a wavenumber spectrum restricting filter F(k) is defined that allows only data having wavenumbers in the range $-k_0 \leq k \leq k_0$ to pass:

$$F(k) = \begin{bmatrix} 1, & |k| \leq k_0 \\ 0, & |k| > k_0 \end{bmatrix}$$

The wavenumber filter in the offset domain is then equal to:

$$f(q) = \int_{-k}^{k_0} F(k)\exp(-i2\pi kq)\,dk = 2k_0 \operatorname{sinc}(2k_0 q)$$

where the sinc-function is defined as:

$$\operatorname{sinc}(y) = \frac{\sin(\pi y)}{\pi y}$$

In practice, the sinc-function may be truncated to avoid excessive filter lengths. The reduced filters may, for instance, only contain y-values up to a value of 2–3. A filter that gives the most optimal results for the given filter length can then be determined. MATLAB-routines can be used, for instance, to calculate FIR-filters of specified length which truncate the sinc-function by minimizing the least-squares error. The optimized truncated filters may be derived in the field, after observing the results obtained when these filters are applied to actual seismic data acquired in the seismic survey area. This type of filter acts as a spatial filter, allowing the seismic data to be properly spatially anti-aliased.

The filtered data s(q), i.e. the spatially filtered seismic data, in the offset-domain is a spatial convolution of the raw data g(q) with the filter f(q):

$$s(q) = \int_{-\infty}^{\infty} g(q')f(q-q)\,dq' \quad \text{(in continuous notation)},$$

or $$s(q_j) = \sum_{j=j_1}^{j_2} g(q_j)f(q_j - q_j)\cdot \Delta q_j \quad \text{(in discrete notation)}$$

Since, at the edges of the data volume, not all filter coefficients are used in the convolution, it is ensured that the filter strength is the same for all output points by normalizing the filter coefficients by the area $\int f(q)dq$. In addition, edge effects can be reduced by application of one-sided filters at the edges.

This filter is particularly suitable for the so-called uniform sampling geometries. In these geometries, receivers are positioned along a straight line at regular intervals of—typically—between 2 and 20 meters. For 2D geometries (that is, the source in-line with the receiver line), the K-filter can be implemented very efficiently (discrete convolution via a fast summation process) because the sampling in offset is regular for this type of geometry.

For 3D geometries, or for 2D geometries which deviate from the perfect uniform sampling geometry, the convolution integral discussed above must be calculated via a discrete integration routine. The filter f(q) is typically pre-calculated for a sufficiently large offset range, at regularly spaced intervals. The data points all correspond to a certain offset; with the offset sampling of the seismic signals being in general irregular. Then, for each output point s(q), the integral can be calculated as follows:

- calculate all the offsets q' associated with the receiver locations
- determine the filter coefficients f(q–q') for the given q-value, for all values of q'
- calculate the integral by summing the product of the receiver outputs, the filter coefficients, and the (varying) offset sampling interval dq'

The process is normally done for each time sample. Additional methods can be used to improve the performance of the algorithm. For example, the integration need not necessarily be performed using all data points. All that is required is a certain integration accuracy. The integral can be calculated using conventional mathematical integration routines. In integration, the step size is of primary importance. For our particular application, the minimum integration step size is determined by the offset increment. For the geometry shown in FIG. 2, the offset increment is given by:

$$\Delta p = x/p\Delta x$$

Since $$\Delta p \geq x$$

where the equality sign only holds for r=0 (i.e. a 2D configuration), then $$\Delta p \leq x$$

That is, the offset sampling is always finer than the geophone (i.e. sensor 16) spacing in the in-line direction. Also, the offset sampling is varying along the receiver line. As an example, consider a cross-line shot offset of 1000 meters (r=1000), and a 5 meter receiver interval ($\Delta x=5$); then, the following table gives some offset increments at several positions along the receiver line.

| Geophone position (x) in meters | Offset increment $\Delta p$ |
|---|---|
| 5 | 0.025 |
| 100 | 05 |
| 500 | 2.2 |
| 1000 | 3.5 |
| 3000 | 4.7 |

It is apparent that, close to the origin, the offset sampling increment $\Delta p$ is very fine; further away, it increases gradually and approaches the geophone spatial sampling interval $\Delta x$ asymptotically as $|x|\to\infty$. So the spatial convolution integral can be calculated using only a few traces around the origin and gradually increasing the number of data traces as offset increases.

The integration limit is subject to the constraint that both the filter and the data are of finite length. If, for instance, the filter is symmetrical and extends on each side to a $k_0$-value of $1/(2*50)=0.01$, the filter span should typically cover an offset range of 200 or 300 meters. To be more precise; suppose we filter the trace positioned at a value $x=500$ meters. Assume that the shot has a 1000 meter s cross-line offset, this corresponds to a p-value of approximately 1120. If the filter span (sinc function value) is limited to plus or minus 6 $\pi$, then $k_0*q_{max}=3$. Since $k_0=0\ 01$, then $q_{max}=300$ meters, so up to 300 meters of offset difference will be allowed. Because p=1120, offsets from 820 to 1420 are indicated. Because the minimum offset equals 1000 meters, however, in practice only offsets in the range of 1000–1420 meters can be used. This corresponds to a line length of 1010 meters (x between 0 and 1010 meters). Note that, for the 2D K-filter (with a zero cross-line offset of the shot; r=0), the filter operates over 300 meters of receiver line; thus, in 3D applications, more data points are included in the spatial convolution. Similarly, edge effects for 3D applications are more serious than they are for 2D geometries.

It should be noted that the filter does not need to be symmetrical and it can have any cut-off wavenumber (which in general will be time-dependent). The filter span also depends on the cut-off wavenumber. The product of $k_{cut}$ and $q_{max}$ typically ranges from 1 to 3 (i.e. the truncated sinc function values will be limited to between plus/minus $2\pi$ and plus/minus $6\pi$, respectively).

The wavenumber filter can be simultaneously used as a spatial anti-alias filter and to reduce the sampling frequency of the data. The K-filter may be used, for instance, to resample individual sensor data from a very dense grid (typically 5 to 10 meter receiver spacing) to a much coarser output sampling (typically 25 to 50 meter receiver spacing). This produces data that is free of spatial aliasing and therefore subsequent application of a F-K filter on the data would not suffer from any aliasing effects. It is also possible to choose the type of output grid for the filtered data produced using the K filter. The data can be filtered, for instance, with the original spatial offset sampling, which is very likely to be irregular, or onto an output grid that is regularly sampled in offset. Resampling the data to a regular output grid allows the data to be easily input into other seismic data processing programs, such as FFT and DMO programs, and may be useful during quality control analysis.

There are three different options for defining the cut-off wavenumber for the K filter. The first option consists in assigning a constant value to the cut-off wavenumber. The second option takes into account the time dependency of the cut-off wavenumber. In this case, a table of cut-off wavenumbers defines the evolution of the cut-off wavenumber versus time. The third option is to define a time-dependent cut-off wave number using a velocity model of a dipping layered earth.

A proper limit for the K-filter using this third option can be found by defining a frequency $f_{keep}$ below which all reflection energy has to be preserved. The wavenumber limit ($k_{cut}$=the cutoff wavenumber) can then be described as follows:

$$k_{cut} = \frac{f_{keep}}{\frac{dp}{dt}} = \frac{f_{keep}(t)}{v_{app}(t)}$$

where $v_{app}$ is the time dependent apparent velocity of the reflection. For a given seismic event (reflector) the apparent velocity will change as the offset distances increase. The apparent velocity is at a minimum for the maximum offset distance (for non-dipping layers), and this value is typically used.

For a dipping layer, the cutoff wavenumber can be obtained using the expression for the apparent velocity:

$$v_{app} = v\sqrt{1 + \frac{p}{vt_0}\left(\frac{p}{vt_0} + \frac{p}{vt_0} + 2\sin\theta\right)} \times \left[\frac{p}{vt_0} + \sin\theta\right]^{-1}$$

where v=reflection RMS (stacking) velocity p=source-receiver offset distance $t_0$=zero offset event arrival time $\theta$=dipping layer inclination angle Note that the cutoff wavenumber is time-dependent: the stacking velocity v will in general increase with depth, so the cutoff wavenumber will decrease with depth. Dipping layers will asymmetrically influence the apparent velocities of the reflection energy. The cutoff wavenumber is typically increased to preserve reflection energy having apparent velocities reduced by the dipping layers. NMO correction, as well as data muting due to NMO stretch, will increase the apparent velocities of the reflection energy. The dipping layer case can easily be included in the estimate of the cutoff wavenumber, provided an estimate of the maximum dip is available. Combining these effects may still induce one to apply a safety margin whose value lies between 1 and 2; in other words, one may want to increase the cutoff wavenumber by a factor somewhere between 1 and 2 to account for dipping reflection energy and/or diffractions.

The seismic data should ideally be pre-processed prior to being spatially filtered. The pre-processing steps can include initial static corrections (elevations), perturbation corrections, and an NMO correction using a rough velocity model. The NMO correction should be removed after application of the wavenumber restricting filter. In addition to the previously mentioned pre-processing steps, a ground roll detection scheme can be run to locate the start and end of the ground roll cone. Consequently, if the main purpose of the spatial filtering is to eliminate ground roll, this only needs to be done in the detected ground roll area. Outside the ground roll area, it would be possible to apply a residual NMO correction followed by group forming.

It should be noted that the NMO correction changes the move-out (and thus the apparent velocity) of the ground roll, as follows:

$$v'_g = \frac{v_g v_{NMO}}{\sqrt{v_{NMO}^2 - v_g^2}}$$

where $v_g$ denotes the original ground roll velocity, $v_{NMO}$ denotes the NMO correction velocity and $v_g'$ denotes the ground roll velocity after NMO correction. As a result, the ground roll velocity increases after NMO, and consequently the ground roll attenuation by the K filter decreases as more lower frequencies are passed unattenuated. Its use, however, provides for better reflection energy preservation.

The NMO correction also changes the frequency content of the data. The frequency shift is given by:

$$\Delta f = f(1 - 1/a)$$

in which a is, for the ground roll, given by $$a = \frac{v_{NMO}}{\sqrt{v_{NMO}^2 - v_g^2}}$$

This effect reduces the frequency content of the ground roll, but it is only significant if the ground roll velocity is large.

Figure 4:
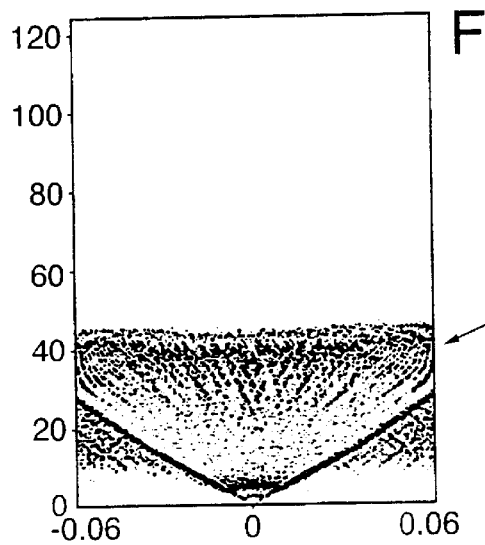
FIGS. 4 and 5 compare the F-K spectra obtained for synthetic ground roll energy with respect to receiver coordinates and reduced offset coordinates, respectively.
Figure 5:
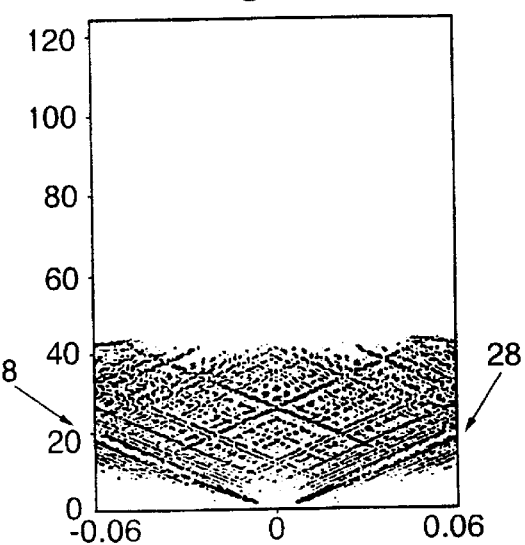

FIGS. 4 and 5 compare the F-K spectra obtained from analyzing synthetic seismic data having only ground roll energy with respect to the receiver coordinate system and with respect to the reduced signed offset distance coordinate system discussed above. The wavenumber axes are located along the bottoms of FIGS. 4 and 5 and the frequency axes are located along the left hand sides of FIGS. 4 and 5.

The primary ground roll energy in FIG. 4 appears as a broad triangularly-shaped fan 26 having its base at the zero-frequency zero-wavenumber point. The ground roll energy has been almost uniformly smeared across the area inside the fan due to the use of the receiver coordinate system. It is this smearing of the ground roll energy near the k=0 axis that prevents conventional F-K filtering from effectively attenuating ground roll energy for 3D data.

In FIG. 5, the reduced signed offset distance coordinate system has been used, and the primary ground roll energy appears as a pair of narrow stripes 28 running from the zero-frequency zero-wavenumber point to the 20 Hz, +/−0.05 wavenumber points. While a portion of the ground roll energy appears between these narrow stripes, this portion represents a small fraction of the total ground roll energy. This preservation of position of the ground roll energy in the F-K domain when using calculated offset distances is fundamentally important to the successful implementation of the inventive method.

Figure 6:
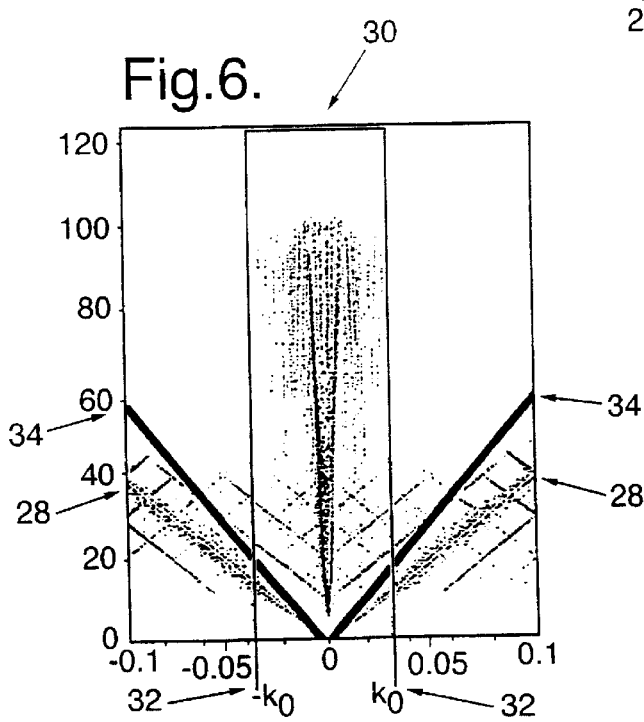
FIG. 6 shows the F-K spectra of example seismic data and how ground roll and random noise energy can be attenuated using the inventive method.

FIG. 6 shows the F-K spectra obtained from example seismic data, containing both ground roll energy and reflection energy, with respect to calculated offset distances. The position of the ground roll energy in the F-K domain has been preserved as a pair of narrow stripes 28 as shown in FIG. 5 above. The reflection energy 30 remains centered about the k=0 axis. A frequency-independent wavenumber restricting filter pass-band region 32 is shown that shows that the output data will only contain data having absolute wavenumbers less than approximately 0.033. A frequency-dependent wavenumber restricting filter pass-band region 34 is also shown that shows that the output data to data will only contain data having an apparent velocity greater than 600 meters per second. When the frequency-independent wavenumber restricting filter and the frequency-dependent wavenumber restricting filter are applied to the seismic data, the ground roll energy and random noise appearing outside of these regions (i.e. energy having an absolute wavenumber greater than 0.033 or an apparent velocity less than 600 meters per second) will be successfully attenuated (removed from the seismic data).

Although the method of the present invention is typically implemented using a suitably programmed general purpose data processor, it is also possible to apply the method as a hardware implementation where the K filter and/or the F-K filter are applied for each sensor in a box, using data from other adjacent sensors, and applying the numerical integration using appropriate filter coefficients and the actual offset data for each of the sensors.

Another typical hardware implementation of the method of the invention is shown in FIG. 7. In this implementation, digital seismic data signals from the sensors 16 are applied via a preprocessor 40 to a spatial filter 42, typically a K filter. The filter 40 receives as further inputs offset distance signals calculated from source and sensor position input signals by a calculating unit or processor 44, as well as filter coefficients stored as a look-up table in a memory unit 46. The spatially filtered data signals produced by the filter 42 are then applied to a main processor 48 for further processing, which can include further F-K filtering if desired.

The wavenumber spectrum of the seismic data could also be restricted later in processing by utilizing frequency dependent wavenumber filtering (an F-K filter). The F-K filter is significantly more CPU-intensive than the K filter discussed above because the filter is no longer frequency-independent. Consequently, a two-dimensional convolution needs to be performed in the offset-time domain; or equivalently, a multiplication needs to be performed in the F-K domain. Typically, the F-K filter is applied in the frequency domain. In addition, the filter calculation is a non-trivial task which involves a careful selection of pass-bands and taper lengths. The F-K filter is also applied to the seismic data in the calculated offset distance coordinate domain discussed above. The advantage of applying the F-K filter is that it is capable of almost completely removing the ground roll (even the ground roll energy with low frequencies and low absolute value wavenumbers). While the K filter is typically applied to the seismic data over the entire time record, when the F-K filter is applied in connection with the inventive method, the F-K filter is typically applied only in the limited time window in which ground roll energy appears in the seismic data.

The F-K filter can be applied, for instance, by applying a Fast Fourier Transform (FFT) to the selected time window for each trace; and then for each frequency sample up to the maximum frequency, designing a low-pass wavenumber filter from the knowledge of the maximum cut-off wave number, the maximum frequency, and the frequency sample, applying the K filter for each "reduced offset" at the original position; applying an inverse FFT in the selected time window for each trace; and then merging the time windows with filtered data, inside the time window in which the F-K filter is applied, and the unfiltered data outside this window.

In another implementation, data at regular offsets is obtained by interpolation, the filter is applied and the filtered data is then restored to a regular output grid by interpolation. In yet another implementation, the K and F-K filters were combined in a single operation.

While this application focuses on the K filter and the F-K filter embodiments of the present invention, it will be understood that the described benefits can also be obtained using other types of spatial filters, such as tau-p filters.

The present invention includes any novel feature or novel combination of features disclosed herein, either explicitly or implicitly.

What is claimed is:

1. A method of acquiring and processing seismic data, said method comprising the steps of:

deploying a plurality of seismic sensors, actuating a seismic source, receiving seismic signals produced by said seismic source using said seismic sensors, calculating offset distances between said seismic source and said seismic sensors, and producing spatially filtered seismic data using said received seismic signals and said calculated offset distances.

2. A method as claimed in claim 1, in which said seismic sensors are located along a receiver line and said seismic source is located offset from said receiver line.

3. A method as claimed in claim 2, in which said offset distances are calculated by determining the distances between said seismic source and said seismic sensors and then reducing these distances by the distance between said seismic source and a best-fit line through said seismic sensors.

4. A method as claimed in claim 3, in which a point exists on said line nearest said seismic source and said seismic sensors are assigned positive reduced offset distance values if they are located on one side of this point and are assigned negative reduced offset distance values if they are located on the other side of this point.

5. A method as claimed in claim 1, in which said spatially filtered seismic data is produced using a wavenumber filter, at least a portion of which is frequency independent.

6. A method as claimed in claim 1, in which said spatially filtered seismic data is produced using a wavenumber filter, at least a portion of which is frequency dependent.

7. A method as claimed in claim 1, in which a range of passband wavenumbers is used and this range is directly related to anti-aliased spatial resampling of the received seismic signals.

8. A method as claimed in claim 1, in which the wavenumber spectrum of the seismic data is restricted by spatially convolving the received seismic signals with a wavenumber filter of the form:

$$f(q) = 2k_0 \frac{\sin(2\pi k_0 q)}{2\pi k_0 q}$$

where the passband range of wavenumbers in the seismic data is restricted to $-k_0 \leq k \leq k_0$ and where q represents said offset distances.

9. A method as claimed in claim 8, in which said wavenumber filter is a truncated wavenumber filter having a limited allowable range of values of $k_0 q$.

10. A method as claimed in claim 1, in which said wavenumber filter is calculated once, densely sampled, and stored as a look-up table.

11. A method as claimed in claim 1, in which said spatially filtered seismic data is produced by hardware components during a data acquisition phase of a seismic survey.

12. A method as claimed in any claim 1, in which said seismic sensors are positioned in sensor arrays at a plurality of receiver station locations along a receiver line and said spatially filtered seismic data is produced using received seismic signals from seismic sensors located at a plurality of said receiver station locations.

13. A method as claimed in claim 1, in which said spatially filtered seismic data is produced using a time dependent cut-off wavenumber, said cut-off wavenumber decreasing with time as corresponding reflection stacking velocities increase, thereby allowing reflection energy to be preserved in both shallow and deeper regions.

14. A method as claimed in claim 13, in which said time dependent cutoff wavenumber is determined using a model which calculates apparent reflection velocities using reflection stacking velocities and dipping layer inclination angles.

15. A method of acquiring and processing seismic data, said method comprising the steps of:

deploying a plurality of seismic sensors at a receiver station location, actuating a seismic source, receiving seismic signals produced by the seismic source using said seismic sensors, calculating offset distances between said seismic source and said seismic sensors, and applying a spatial filter to said seismic signals using said calculated offset distances to produce spatially filtered seismic data associated with said receiver station location.

16. A seismic data acquisition system for use in conjunction with a seismic source, said system comprising: a plurality of seismic sensors, means for receiving seismic signals produced by said seismic source using said seismic sensors, means for calculating offset distances between said seismic source and said seismic sensors, and means for producing spatially filtered seismic data using said received seismic signals and said calculated offset distances.

17. A seismic data acquisition system as claimed in claim 16, in which said means for producing spatially filtered seismic data restricts at least a portion of said wavenumber spectrum in a frequency independent manner.

18. A seismic data acquisition system as claimed in claim 17, in which said seismic data has a different spatial sampling frequency than said seismic sensor spatial sampling frequency and said means for producing spatially filtered seismic data uses a range of passband wavenumbers directly associated with anti-aliased spatial resampling of the received seismic signals from said seismic sensor sampling frequency to said seismic data sampling frequency.

19. A seismic data acquisition system as claimed in claim 16, in which said seismic sensors have irregular offset distance sampling intervals and said means for producing spatially filtered seismic data includes means for producing seismic data having regular output distance sampling intervals.

20. A seismic data acquisition system as claimed in claim 16, in which said means for producing spatially filtered seismic data spatially convolves said received seismic signals with a wavenumber filter that has been calculated once, densely sampled, and stored as a look-up table.

21. A seismic data acquisition system as claimed in claim 16, in which said means for producing spatially filtered seismic data includes hardware components that filter said received seismic signals using said calculated offset distances during a data acquisition phase of a seismic survey.

22. A seismic data acquisition system as claimed in claim 16, in which said seismic sensors are positioned in sensor arrays at a plurality of receiver station locations along a receiver line and said means for producing spatially filtered seismic data is produced utilizes received seismic signals from seismic sensors located at a plurality of said receiver station locations.

* * * * *